(12) United States Patent
Masure et al.

(10) Patent No.: US 11,601,807 B2
(45) Date of Patent: Mar. 7, 2023

(54) MOBILE DEVICE AUTHENTICATION USING DIFFERENT CHANNELS

(71) Applicant: Belgian Mobile ID SA/NV, Brussels (BE)

(72) Inventors: Marc Masure, Enghien (BE); Remy Knecht, Heist-op-den-Berg (BE)

(73) Assignee: BELGIAN MOBILE ID SA/NV, Brussels (BE)

( * ) Notice: Subject to any disclaimer, the term of this patent is extended or adjusted under 35 U.S.C. 154(b) by 212 days.

(21) Appl. No.: 16/616,346

(22) PCT Filed: May 30, 2017

(86) PCT No.: PCT/EP2017/063062
§ 371 (c)(1),
(2) Date: Nov. 22, 2019

(87) PCT Pub. No.: WO2018/219437
PCT Pub. Date: Dec. 6, 2018

(65) Prior Publication Data
US 2020/0162910 A1 May 21, 2020

(51) Int. Cl.
*H04L 29/06* (2006.01)
*H04W 12/06* (2021.01)
(Continued)

(52) U.S. Cl.
CPC .......... *H04W 12/06* (2013.01); *H04L 63/083* (2013.01); *H04W 12/71* (2021.01)

(58) Field of Classification Search
CPC ... H04L 9/3271; H04L 9/3215; H04L 63/083; H04L 9/0866; H04L 9/3234;
(Continued)

(56) References Cited

U.S. PATENT DOCUMENTS 8,346,672 B1   1/2013  Weiner et al.
8,601,266 B2 * 12/2013  Aabye .................. G06F 21/445
                                                          713/168
(Continued)

FOREIGN PATENT DOCUMENTS

EP         2680627 A1    1/2014
GB         2397731 A     7/2004
WO    2016/092318 A1    6/2016

OTHER PUBLICATIONS

Abughazalah et al, Secure Mobile Payment on NFC-Enabled Mobile Phones Formally Analysed Using CasperFDR, Sep. 26, 2014, IEEE, pp. 422-431. (Year: 2014).*

(Continued)

*Primary Examiner* — Kari L Schmidt
*Assistant Examiner* — Jenise E Jackson
(74) *Attorney, Agent, or Firm* — Brown Rudnick LLP; Ian G. DiBernardo

(57) ABSTRACT

An authentication system is disclosed which is configured, in response to receiving a request to authenticate a transaction, to send a first challenge to a mobile terminal via a first channel and, in response to receiving a first response to the first challenge to determine whether the first response is correct, to send a second challenge to the mobile terminal via a second, different channel and, in response to receiving a second response to the second challenge to determine whether the second response is correct, and, in dependence upon the first and second responses being correct, to signal that the transaction is authenticated.

7 Claims, 16 Drawing Sheets

(51) Int. Cl.
*H04L 9/40* (2022.01)
*H04W 12/71* (2021.01)

(58) Field of Classification Search
CPC .......... H04L 63/0876; H04L 2209/127; G06F 21/42; G06F 21/44; G06F 21/73; G06F 2221/2103; G06F 21/123; H04W 12/06; H04W 12/71
See application file for complete search history.

(56) References Cited

U.S. PATENT DOCUMENTS

| | | |
|---|---|---|
| 2008/0295159 A1 | 11/2008 | Sentinelli |
| 2009/0119754 A1 | 5/2009 | Schubert |
| 2011/0086616 A1* | 4/2011 | Brand ................. H04L 63/0876 455/411 |
| 2011/0093920 A1 | 4/2011 | Etchegoyen |
| 2012/0131340 A1* | 5/2012 | Teuwen ................. H04L 9/3273 713/168 |
| 2012/0149330 A1* | 6/2012 | Watson ............... H04W 12/065 455/411 |
| 2013/0046976 A1* | 2/2013 | Rosati ................. H04W 12/069 713/168 |
| 2013/0244614 A1 | 9/2013 | Santamaria et al. |
| 2013/0297794 A1 | 11/2013 | Yach et al. |
| 2014/0279532 A1* | 9/2014 | Tremlet ................ G06Q 20/388 705/44 |
| 2015/0073992 A1 | 3/2015 | Weiner et al. |
| 2015/0089214 A1* | 3/2015 | Dupre ................. H04W 12/069 713/155 |
| 2015/0134552 A1* | 5/2015 | Engels .................. H04L 9/3297 705/318 |
| 2015/0304316 A1* | 10/2015 | Ye ......................... H04W 12/48 455/411 |
| 2016/0309327 A1* | 10/2016 | Grimault ................. H04L 51/36 |
| 2017/0149777 A1 | 5/2017 | Benson et al. |
| 2017/0364911 A1* | 12/2017 | Landrok ................ H04L 9/3228 |

OTHER PUBLICATIONS

Hallsteinsen et al, Using the Mobile Phone as a Security Token for Unified Authentication, Aug. 31, 2007, IEEE, pp. 1-6. (Year: 2007).*
Search Report dated Jun. 8, 2020 in Singapore Patent Application No. 11201910806Y.
Written Opinion dated Jun. 8, 2020 in Singapore Patent Application No. 11201910806Y.
International Search Report and Written Opinion dated Feb. 28, 2018 in International Application No. PCT/EP2017/063062.

* cited by examiner

MOBILE DEVICE AUTHENTICATION USING DIFFERENT CHANNELS

FIELD OF THE INVENTION

The present invention relates to authentication.

BACKGROUND

Electronic commerce, social media access and other forms of on-line digital activity or service usually require some form of user authentication or user identification. For example, a user wishing to access a banking website or application may be required to enter a username and password. This approach, however, is generally considered not only to be inconvenient, as it requires the user to remember his or her username and password, but also to be vulnerable to fraudulent access since the user can choose a password which is simple and/or easy to guess or find by someone other than the proper user. Added to this, the user may need many different usernames and passwords for different activities or services which makes it harder for the user to remember usernames and passwords and so making it more likely that he or she will use the same username and passwords for several services.

Security can be increased by using more than one factor, such as a password or other form of knowledge factor, and a token generator or other form of possession factor. In particular, mobile phone two-factor authentication (whereby a user's mobile phone can be used to provide one-time password) is becoming increasingly popular.

Convenience can be improved by using an approach, for example, which does not require a password or allows a single log in. For example, GSMA Mobile Connect allows a user to log into a website or application without a username or password. Further details can be found at mobile-connect.io.

SUMMARY

According to a first aspect of the present invention there is provided an authentication system which is configured, in response to receiving a request to authenticate a transaction, to send a first challenge to a mobile terminal via a first channel and, in response to receiving a first response to the first challenge to determine whether the first response is correct, to send a second challenge to the mobile terminal via a second, different channel and, in response to receiving a second response to the second challenge to determine whether the second response is correct, and, in dependence upon the first and second responses being correct, to signal that the transaction is authenticated.

The first challenge may be sent to an applet (or "SIM applet") on a secure element (such as a SIM, a USIM, a UICC embedded SIM, embedded UICC or virtual SIM) in the mobile terminal. The first channel may comprise a mobile phone network operator channel used to communicate securely with a secure element. The first channel preferably comprises an over-the-air (OTA) channel. The OTA channel may be an SMS-based OTA channel. The OTA channel may be a TCP/IP-based OTA channel. The second channel may comprise the Internet. The second channel may be provided via a short-range communications network link (such as WiFi) or mobile data link.

The authentication system may be configured, in relation to the first challenge, to retrieve a secure element identifier uniquely identifying a secure element in the mobile terminal (for example, an IMSI) and a hardware identifier uniquely identifying the hardware of the mobile terminal (for example, an IMEI), and to transmit the first challenge to the secure element via the first channel. The first reply may include a terminal fingerprint and/or a password (such as a one-time password), wherein the terminal fingerprint includes the secure element identifier and the hardware identifier or is generated in dependence on the secure element identifier and the hardware identifier. The authentication system is configured to determine whether the received terminal fingerprint is correct in dependence upon the retrieved secure element identifier and hardware identifier and/or to determine whether the received password is correct in dependence upon a locally-generated or locally-held password.

The authentication system may be configured, in relation to the second challenge, to transmit information relating to the transaction. The second response may include a password generated in dependence on a terminal fingerprint generated by the terminal and at least some of the information relating to the transaction. The authentication system may be configured to determine whether the received password is correct in dependence upon a locally-generated or locally-held password.

The second response may be signed or encrypted with a key (key K1). The first and second responses may be signed or encrypted with first and second different keys (K2, K1) respectively.

The authentication system may be configured, in an enrolment phase, to exchange data with the mobile terminal via the second channel so as to receive a terminal fingerprint of the mobile terminal via the second channel and to exchange data with the mobile terminal via the first channel so as to determine the secure element identifier and the hardware identifier of the terminal via the first channel.

The authentication system may be configured, in an enrolment phase, to send a key (key K2) to the mobile terminal via the first channel.

According to a second aspect of the present invention there is provided and authentication system configured, in an enrolment phase, to exchange data with a mobile terminal via a second channel so as to receive a terminal fingerprint of the mobile terminal via the second channel and to exchange data with the mobile terminal via a first, different channel so as to determine, via the first channel, a secure element identifier and a hardware identifier of the mobile terminal.

The terminal fingerprint may comprise a set of data about the mobile terminal hardware and/or software running on the mobile terminal, such as the operating system, for uniquely characterising the mobile terminal.

The authentication system may be configured, in response to receiving, from a source, a request to enrol a user comprising a user identifier and a mobile terminal identifier, to transmit a password to the source for presentation to the user and/or to a mobile terminal, in response to receiving, from an application running on the mobile terminal, a first key, a first terminal fingerprint and a copy of the first password via a second channel, to link the user identifier, the mobile terminal identifier, the application and the mobile terminal, to transmit a random number to secure element in the mobile terminal via a first, different channel, to send a second key to the secure element via the first channel, in response to receiving, from the secure element via the first channel, an encrypted message comprising a second terminal fingerprint encrypted with the second key, to transmit a second password, to the secure element via the first channel and, in response to receiving, from the application via the second channel, a copy of the second password and in dependence upon the copy of the second password matching the second password, to link the user identifier and the second terminal fingerprint or data included the second terminal fingerprint.

According to a third aspect of the present invention there is provided a mobile terminal for use in authenticating a transaction, the mobile terminal configured, in response to receiving a first challenge from an authentication system via a first channel, to generate and transmit a first response to the authentication system via the first channel, and, in response to receiving a second challenge from the authentication system via a second, different channel, to generate and transmit a second response, in response to receiving a second response to the second challenge to the authentication system via the second channel.

The mobile terminal may comprise a secure element and a processor-based controller. The secure element may generate the first response and the processor-based controller may generate the second response. An application on the secure element may generate the first response.

The mobile terminal may be configured, in an enrolment phase, to exchange data with the authentication system via the second channel so as to provide a terminal fingerprint of the mobile terminal to the authentication system via the second channel and to exchange data with the authentication system via the first channel so as to provide the secure element identifier and the hardware identifier of the mobile terminal to the authentication system via the first channel.

According to a fourth aspect of the present invention there is provided a mobile terminal for use in authenticating a transaction, configured, in an enrolment phase, to exchange data with an authentication system via a second channel so as to provide a terminal fingerprint of the mobile terminal to the authentication system via the second channel and to exchange data with the authentication system via a first, different channel so as to provide a secure element identifier and a hardware identifier of the mobile terminal to the authentication system via the first channel.

According to a fifth aspect of the present invention there is provided an authentication method comprising, in response to receiving a request to authenticate a transaction, sending a first challenge to a mobile terminal via a first channel and, in response to receiving a first response to the first challenge, determining whether the first response is correct, sending a second challenge to the mobile terminal via a second, different channel and, in response to receiving a second response to the second challenge to determining whether the second response is correct, and, in dependence upon the first and second responses being correct, signalling that the transaction is authenticated.

According to a sixth aspect of the present invention there is provided an enrolment method comprising exchanging data with a mobile terminal via a second channel so as to receive a terminal fingerprint of the mobile terminal via the second channel, and exchanging data with the mobile terminal via a first, different channel so as to determine, via the first channel, a secure element identifier and a hardware identifier of the terminal.

According to a seventh aspect of the present invention there is provided an authentication method comprising, in response to receiving a first challenge from an authentication system via a first channel, generating and transmitting a first response to the authentication system via the first channel, and, in response to receiving a second challenge from the authentication system via a second, different channel, generating and transmitting a second response, in response to receiving a second response to the second challenge to the authentication system via the second channel.

According to an eighth aspect of the present invention there is provided an enrolment method comprising exchanging data with an authentication system via a second channel so as to provide a terminal fingerprint of the mobile terminal the authentication system via the second channel and exchanging data with the authentication system via a first, different channel so as to provide a secure element identifier and a hardware identifier of the terminal to the authentication system via the first channel According to a ninth aspect of the present invention there is provided a computer program which, when executed by a data processing apparatus, causes the data processing apparatus, causes the data processing apparatus to perform a method according to the fifth, sixth, seventh or eighth aspect.

According to tenth aspect of the present invention there is provided a computer program product comprising a computer-readable medium (which may be non-transitory) storing a computer program according to the ninth aspect.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Figure 1:
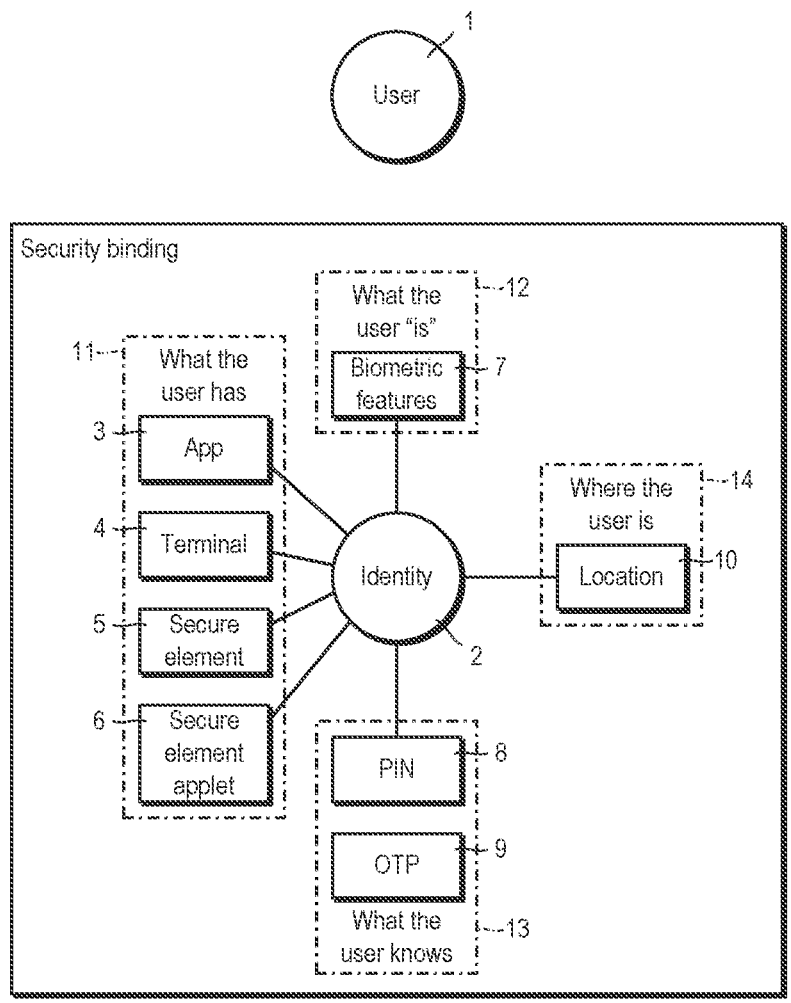
FIG. 1 schematically illustrates security binding whereby identity of a user is linked to a plurality of assets which can be used to secure a transaction.

Referring to FIG. 1, a user 1 has an identity 2 which can be linked to a plurality of assets (or "factors") 3, 4, 5, 6, 7, 8, 9, 10 which may be used to corroborate the identity 2 of the user 1 and, thus, serve to authenticate the user 1.

The assets 3, 4, 5, 6, 7, 8, 9, 10 may include an application (or "app") 3 installed on a mobile terminal 4 (herein simply referred to as the "terminal") which is used as an interface for the user 1 to confirm transactions, the terminal 4, a secure element 5 such as a subscriber identification module (SIM) 5 in the terminal 4, an applet 6 such as a SIM applet on the secure element 5 (herein, the applet 6 is also referred to as a SIM applet), one or more biometric features 7, a personal identification number (PIN) 8 (which does not need to be purely numeric, but which can include letters or other types of characters), a one-time password (OTP) 9 and location 10. Example of mobile terminals 4 include a laptop computer, a smart phone, a tablet, a wearable device or other form of network-enabled device including an Internet-of-Things (or IoT) device or embedded device. Examples of biometric features include fingerprint, iris scan, voice recognition, gesture behaviour, etc. Herein the term "SIM" is intended to cover a Universal Subscriber Identity Module (USIM), a Universal Integrated Circuit Card (UICC), a virtual SIM (such as trusted execution environment (TEE)), and other similar types of mobile terminal secure element.

The assets 3, 4, 5, 6, 7, 8, 9, 10 may fall into one of several categories 11, 12, 13, 14 which define a relationship to the user. For example, an asset 3, 4, 5, 6 may be a user possession 11, i.e. what the user has. An asset 7 may be a user physical characteristic 12 (herein referred to as a "biometric feature"), i.e. what the user "is". An asset 8, 9 may be user knowledge 13, i.e. what the user knows. An asset 10 may be user location 14, i.e. where the user is.

These assets 3, 4, 5, 6, 7, 8, 9, 10 can provide n-factor authentication, where n=2, 3, 4 or more, using at least one asset 3, 4, 5, 6, 7, 8, 9, 10 in each of at least two, preferably at least three, different relationship-defining categories 11, 12, 13, 14, such as the app 3 and the terminal 4, and the PIN 8 and/or the biometric feature 7.

Figure 2:
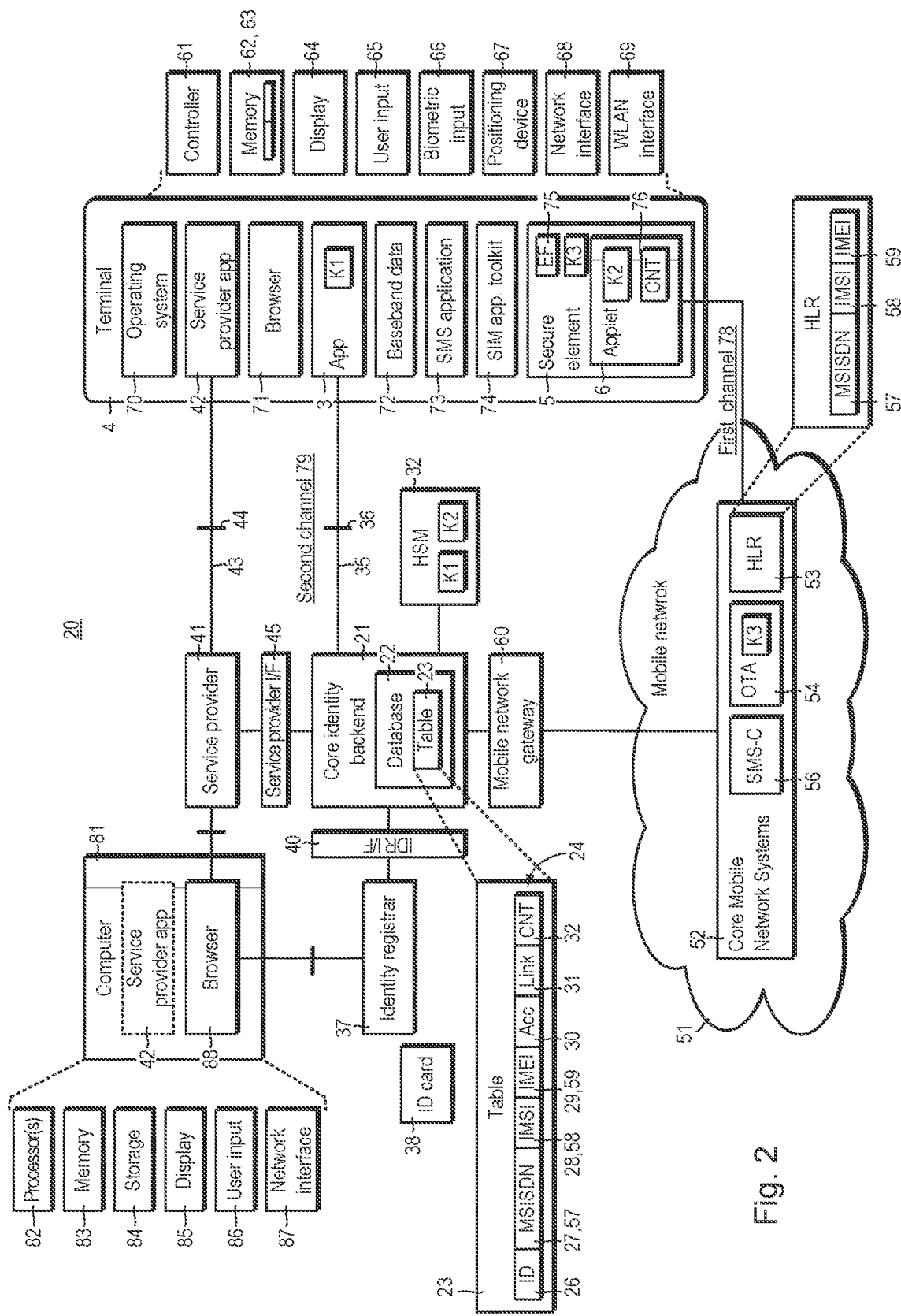
FIG. 2 is a block diagram of an authentication system which includes a core identity backend (or "authentication server"), a mobile terminal, and a mobile network, in which a user can link their identity to a plurality of assets and use at least some of those assets to authenticate a transaction.

Referring to FIG. 2, a system 20 is shown.

The system 20 includes an authentication system 21 (herein also referred to as "a core identity backend") which may comprise one or more servers and which includes a database 22 storing a table 23 which includes an entry 24 for each user enrolled with the system. As will be explained in more detail later, an entry 24 includes a plurality of fields 26, 27, 28, 29, 30, 31, 32 related to the user and their identity-corroborating assets 3, 4, 5, 6, 7, 8, 9, 10 (FIG. 1).

The authentication system 21 is provided with a hardware security module (HSM) 32 which can generate or store user-specific keys K1, K2. An example of a suitable HSM 32 is the Ezio Confirm Authentication Server marketed by Gemalto N.V., Amsterdam, The Netherlands.

The app 3 which runs on the terminal 4 contains a corresponding software development kit (SDK) that can handle key creation, securing a connection 35 between the app 3 and the core identity backend 21, detection of rooted or jailbroken device, anti-hook detection, code obfuscation, fingerprinting of the terminal on operating system (OS) side and other security features, such as disable screen capture during PIN entry, secure PIN pad, no view of pressed keys and so on. As will be explained in more detail hereinafter, a key can be used as a seed and a PIN can be used in software to generate a time-based OTP (TOTP), which is sent together with a signed payload containing a terminal fingerprint generated on the operating system side of the terminal OS side and a context of the transaction. The terminal fingerprint is a set of data which is unique to the end user mobile terminal. The context can be signed using OCRA, and the TOTP and OCRA-signed context can be sent to the backend 21 and checked against the calculated corresponding values.

The system 20 includes an identity registrar 37 for example which may be provided by a government office, government agency, bank or other trusted entity. As will be explained in more detail hereinafter, the identity registrar 37 allows an end user 1 (FIG. 1) to transfer his or her verified identity in a secure way to the core identity backend 21. The user 1 (FIG. 1) may present proof of identity 38, for example, in the form of an identity card or passport, in person, at the identity registrar 37, or from a remote location to the identity registrar 35 (i.e. without being present at the identity registrar 38) using a card reader (not shown). The proof of identity 38 may take the form of an electronic device, such as a smart card, which can be read by a card reader (not shown). The authentication server 21 and the identity registrar 37 communicate securely with via an interface 40.

The system 20 includes a server provider 41, such as a bank, on-line vendor etc., which may communicate with a service provider app 42 running on the terminal 4 or other device, or serve webpages to a web browser running on the terminal 4 or another device. The service provider 41 is an external partner delivering services to the end user 1 that integrates the authentication services provided by authentication system 20 including authentication, authorisation, identification and digital signature. The server provider 41 communicates securely with the authentication server 21 via an interface 45. The core identity backend 21 and the service provider 41 can exchanges messages according to a suitable protocol, such as Simple Object Access Protocol (SOAP), OpenID or Security Assertion Markup Language (SAML).

The authentication system 21 is able to communicate with the terminal 4 via a public land mobile network 51 (herein referred to simply as a "mobile network") which comprises core mobile network systems 52 which include, among other things, a home location register (HLR) 53, over-the-air (OTA) infrastructure 54 which may secure communication with a key K3, and a Short Message Service (SMS) centre 56 (or other messaging service centre).

The HLR 53 stores for each user subscribing to the mobile network, a Mobile Station International Subscriber Directory Number (MSISDN) 57, an International Mobile Subscriber Identity (IMSI) 58 and International Mobile Equipment Identity (IMEI) 59. The MSISDN 57 is often referred to as the mobile phone number of the end user, the IMSI 58 is a unique identifier of the SIM card 5 and the IMEI 59 is a unique identifier of the terminal 4.

The core identity backend 21 and the mobile network 51 communicate securely via a mobile network gateway 60.

The terminal 4 comprises a CPU-based controller 61, volatile and non-volatile memory 62, 63, a display 64, user input device(s) 65, a biometric feature input device 66, a positioning device 67 (for example in the form a GPS receiver), a mobile network interface 68 and wireless local area network interface 69. The display 64 and at least one user input device 65 may be integrated into a touch screen display. Other input devices 66 may include switches. In this example, the biometric feature input device 66 takes the form of a fingerprint scanner for providing touch ID. For clarity and brevity, other parts of the terminal 4, such a battery, speaker, microphone etc., are not described.

The terminal 4 runs an operating system (OS) 70 and can load and run other applications including the service provider app 42, a browser 71 and the authentication app 3 (herein also referred to as the "Belgian Mobile ID app" or "BMID app"). The terminal 4 may run an iOS, Android or other operating system. The mobile terminal 4 may support communication using second generation enhanced data rates for GSM evolution (EDGE) communication protocols, third-generation (3G) communication protocols, HSDPA communication protocols, fourth-generation (4G) communication protocols and/or 4G LTE communication protocols and later communication protocols (such as 5G communication protocols).

Being a mobile terminal 4 which can connect to the mobile network 51, the terminal 4 stores baseband data 72 which contains information used for mobile services, including, for example such as IMEI, mobile country code (MCC), mobile network code (MNC), location area code (LAC) and Cell ID (CID). One or more pieces of baseband data 72 can used as a location asset 10 (FIG. 1).

The terminal 4 runs software 73 for receiving and sending SMS messages or suitable form of message which may be received from mobile network 51. The terminal 4 also runs a secure element software development kit (SDK) 74 (herein referred to as a "SIM software development kit"). The terminal 4 contains a secure element 5 which can take the form of a removably insertable card of given form factor, such as a micro-SIM (3FF) or nano-SIM (4FF), or may take the form of an embedded SIM, such as an eSIM, or virtual SIM (such as TEE). The SIM 5 stores an elementary file (EF) file system 75 and a copy of the OTA key K3.

The SIM applet 6 can store a public-private key pair K2 and also a counter value 76. As will be explained in more detail later, the counter value 76 can be used to generate an OTP. The SIM applet 6 may be installed on the secure element 5, but not initialised when the user takes possession of the SIM 5 (for example when the user buys the terminal or a mobile phone contact). Alternatively, the SIM applet 6 may be downloaded and installed after the user takes possession of the secure element 5.

As will be explained in more detail hereinafter, the authentication app 3 or operating system 70 may generate a fingerprint of the terminal 4 which is unique for the end user terminal.

The user 1 (FIG. 1) can use the terminal 4 and other assets 3, 4, 5, 6, 7, 8, 9, 10 (FIG. 1) to enrol with the core identity backend 21 and authenticate his or her identity using the core identity backend server 21 to secure a transaction with the service provider 41.

Two different channels 78, 79 are used in both setting up an authentication account and during authentication. In the first channel 78, the SIM applet 6 and the core identity backend 21 communicate using the OTA channel of the mobile network 51. In a second channel 79, the BMID app 3 and the core identity backend 21 communicate via the Internet 36 using a WiFi or mobile data connection. Both channels 78, 79 are secured and payloads are encrypted using application and applet keys K1, K2.

The user 1 (FIG. 1) may enrol and/or may request a transaction using the terminal 4. The user 1 (FIG. 1) may enrol and/or may request a transaction via another device 81 (herein simply referred to as a "computer"), such as a desktop computer, laptop computer or tablet device, which is used in conjunction with the terminal 4.

The computer 81 includes at least one processor 82, memory 83, storage 84 (e.g. in the form of SSD), a display 85, one or more user input device(s) 86 and at least one network interface 87 (which may be wired or wireless). The computer 81 can run a browser 88 which may be used to communicate with the identity registry 37 and/or the service provider 41.

Figure 3:
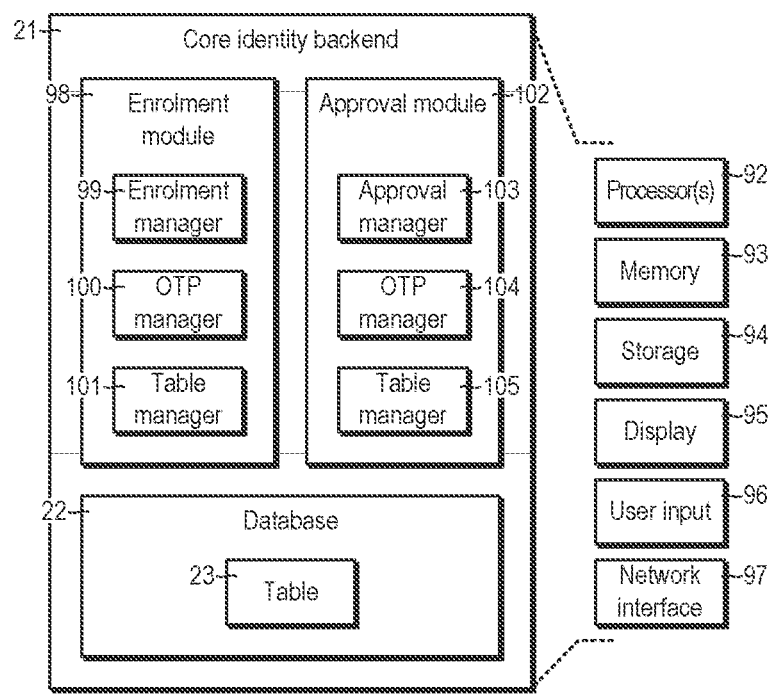
FIG. 3 is a more detailed block diagram of the core identity backend in FIG. 1.

Referring to FIG. 3, the authentication system 21 is shown in more detail.

The core identity backend 21 may take the form of a server comprising at least one processor 92, memory 93, storage 94, a display 95, one or more user input device(s) 96 and at least one network interface 97.

The core identity backend 21 includes an enrolment module 98. The enrolment module 98 includes an enrolment manager 99, password manager 100 and a table manager 101. The authentication server 21 also includes an approval module 102. The approval module 102 includes an approval manager 103, password manager 104 and a table manager 105. Other configurations may be used.

As will be explained in more detail hereinafter, the backend 21 generates two challenges, namely one for the SIM applet 6 and one for the app 4. The SIM applet challenge is based on IMSI, IMEI and a time- or counter-based OTP. The app challenge is based on a terminal fingerprint and a transaction context, where the terminal fingerprint comprises a list of technical parameters or characteristics related to the operating system, device, app, and the like, and an application key K1, with the result being an OTP which is sent to the backend 21. The challenge of the SIM applet 6 is sent to the core backend through the UMTS carrier (OTA/SMS). The challenge/OTP of the app is sent to the core backend through the Internet (WiFi or mobile data). Thus, there are two separate (i.e. independent) channels. The backend 21 checks both challenges to validate if the transaction can go through.

Enrolment

Referring to FIGS. 1, 2, FIGS. 4a to 4d, 5, 6 and FIGS. 7a to 7c, an end user 1 enrols to use the authentication service. During enrolment, the core identity backend 21 links the user's identity 2 to a plurality of assets 3, 4, 5, 6, 7, 8, 9, 10.

A user initiates enrolment through an identity registrar 37 (step S401).

Figure 5:
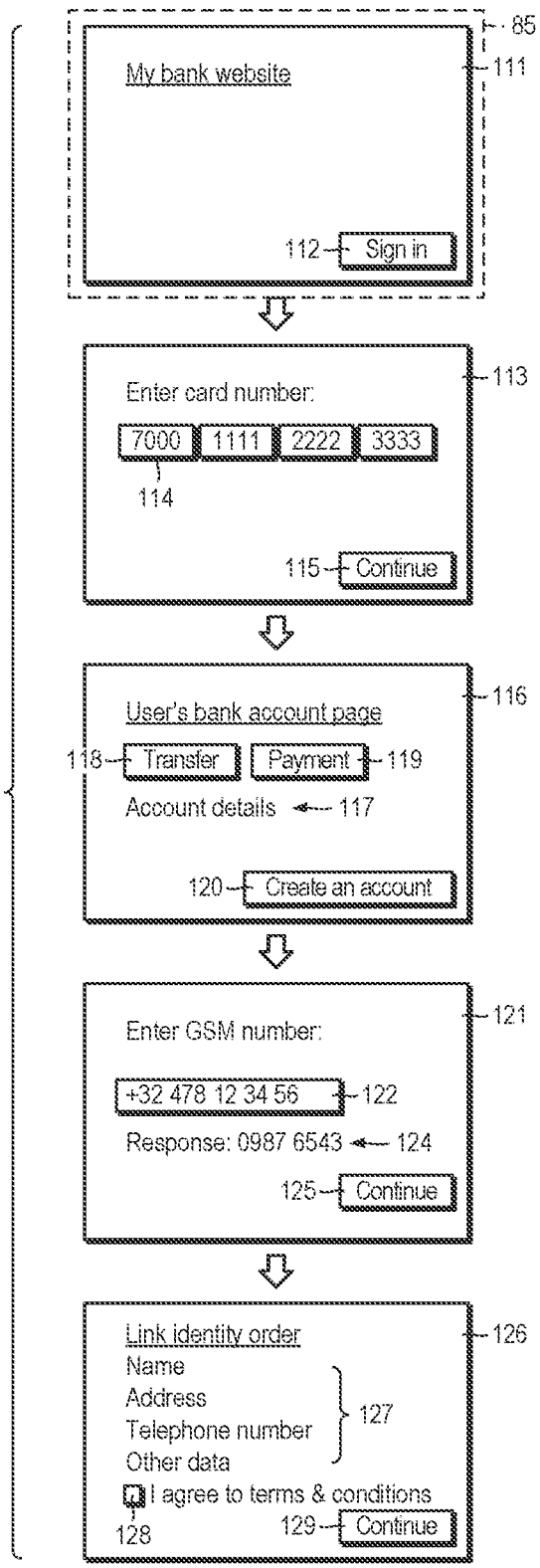
FIG. 5 illustrates an example of a first set of pages presented to a user during enrolment.

FIG. 5 shows an example of how the user 1 can enrol to use the authentication service using a browser 88 on a computer 81 and the terminal 4. The user 1 can, however, enrol using a service provider app 42 running on the computer 81 in conjunction with the terminal 4 or using a service provider app 42 or browser 71 running on the terminal 4, or even in person at, for example, the identity registry 37 using the terminal 4.

In this case, a bank serves an identity registry 37 with which the user has at least one bank account and has previously proved their identity using an identity card 38 or other form of proof of identity.

In the following, an example of set of web pages 111, 113, 116, 121, 126, 130, 135 which are presented to the user 1 are shown. The web pages, including their order and content, can differ.

Referring in particular to FIGS. 2 and 5, the identity registrar server 37 presents the user 1 with a first web page 111 which includes a link 112 to a second web page 113. The user may have already presented credentials to access the first web page 111. The second page 113 includes a field 114 for entering a debit or credit card number, and a link 115 to a third web page 116. The third web page 116 includes information 117 about the account(s), one or more links 118, 119 to perform respective actions, such as transfer funds, make on-line payments, and a link 120 to create an authentication service account, which links to a fourth web page 121. The fourth web page 121 includes a field 122 for entering the telephone number, i.e. the MSISDN 27, of the terminal 4 possessed by the user 1. The fourth web page 121 may include, in response to a challenge (not shown), a response 124. The fourth web page 121 includes a link 125 to a fifth web page 126. The fifth web page 126 includes a summary 127 of user details, a check box 128 for agreeing to terms and conditions, and a link 129 to continue.

Figure 6:
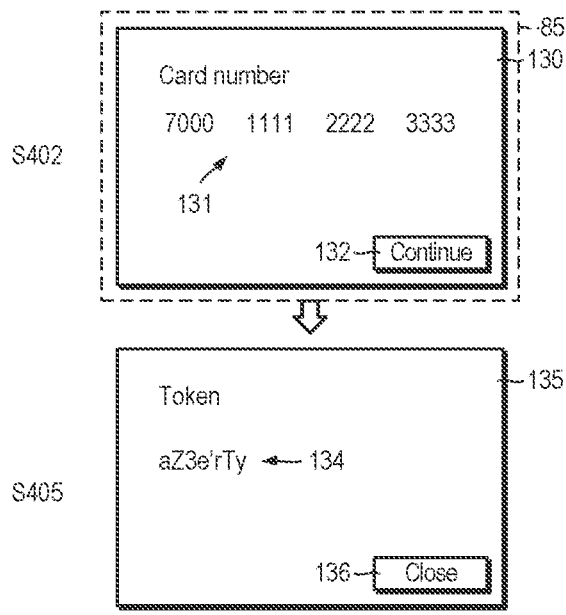
FIG. 6 illustrates an example of a second set of pages presented to a user during enrolment.
Figure 7A:
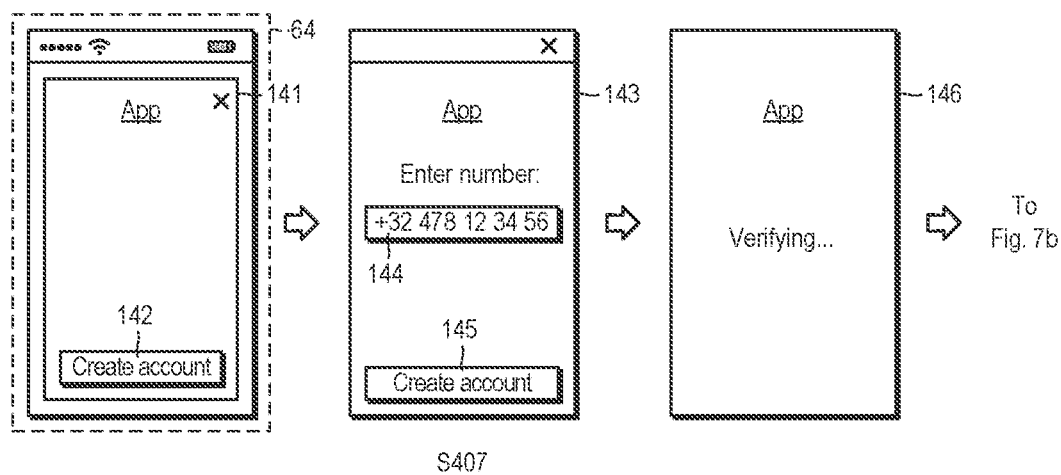
FIGS. 7a to 7c illustrates an example of a third set of pages presented to a user during enrolment.
Figure 7B:
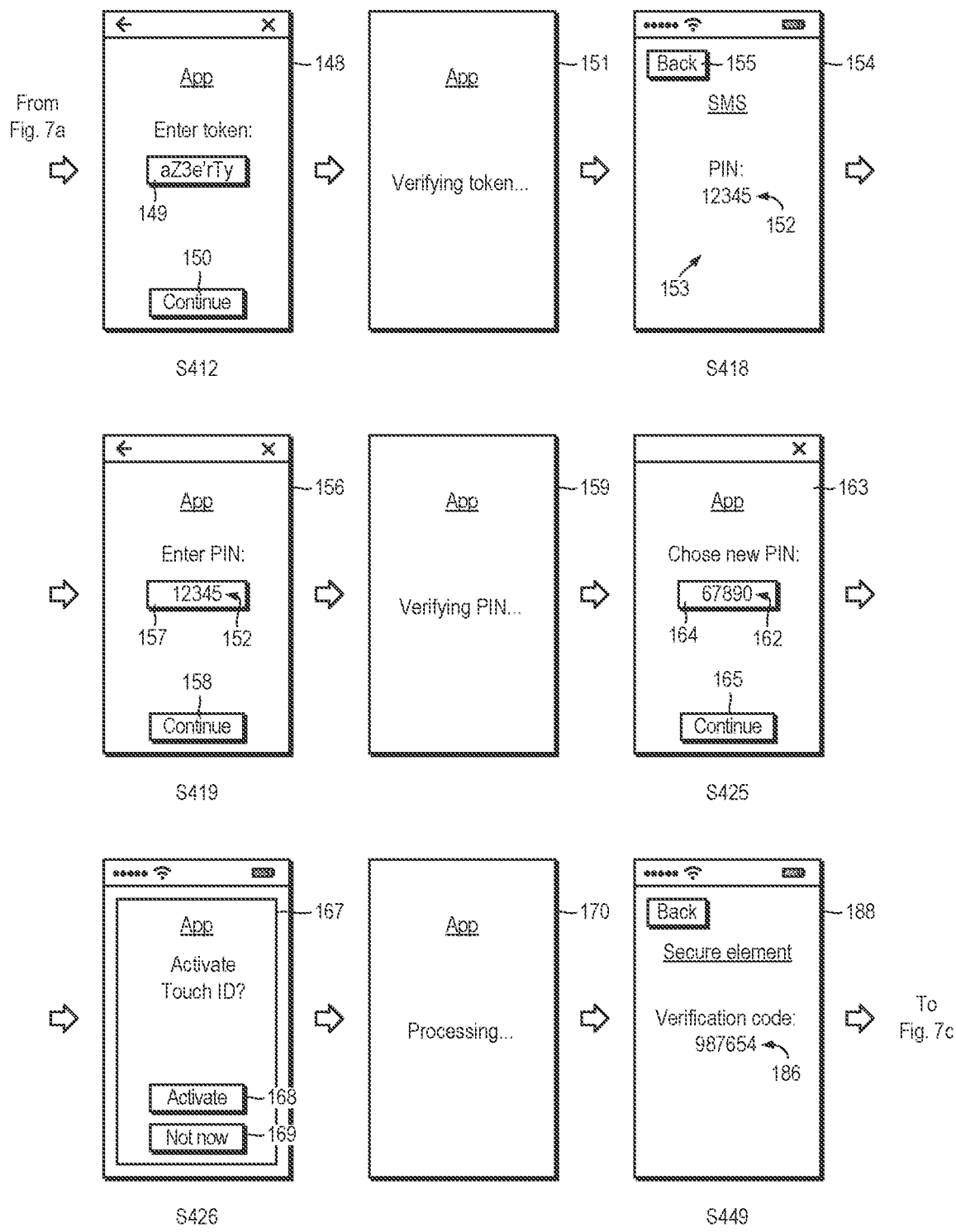
Figure 7C:
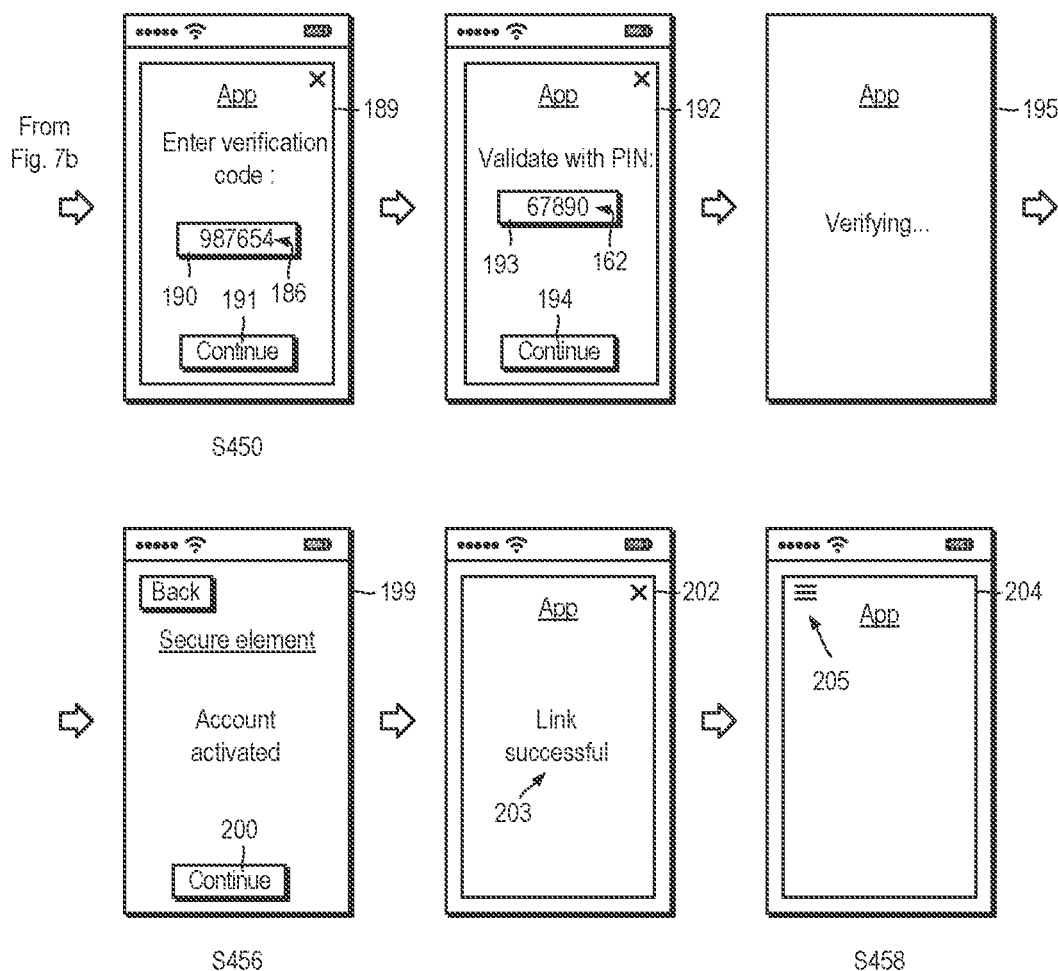

Referring now to FIGS. 2 and 6, the identity registrar server 37 can present a sixth web page 130 to the user 1 which confirms the request to set up an authentication account and includes relevant information 131, such as the MSISDN 27, and a link 132 prompting the user to continue to the next page.

Referring again to FIGS. 2, 4a and 6, in response to receiving agreement of terms and conditions and confirmation to continue, the identity registrar 37 (in this case, the bank) transmits a request 133 to create an authorisation account to the core identity backend 21 (step S402). The request 133 includes the user's identity 26 and the MSISDN 27.

The core identity backend 21 generates an OTP 134 (herein referred to a "token") to secure the session between the identity registrar 37 and the BMID app 3 (step S403) and sends the token 134 over a secure connection to the identity registrar 37 (step S404). The identity registrar 37 presents the token 134 in a seventh web page 135 in the browser 88 at the computer 81 (step S405).

If not already done, the user acts to cause the terminal 4 to download and install the app 3 (step S406).

Figure 4A:
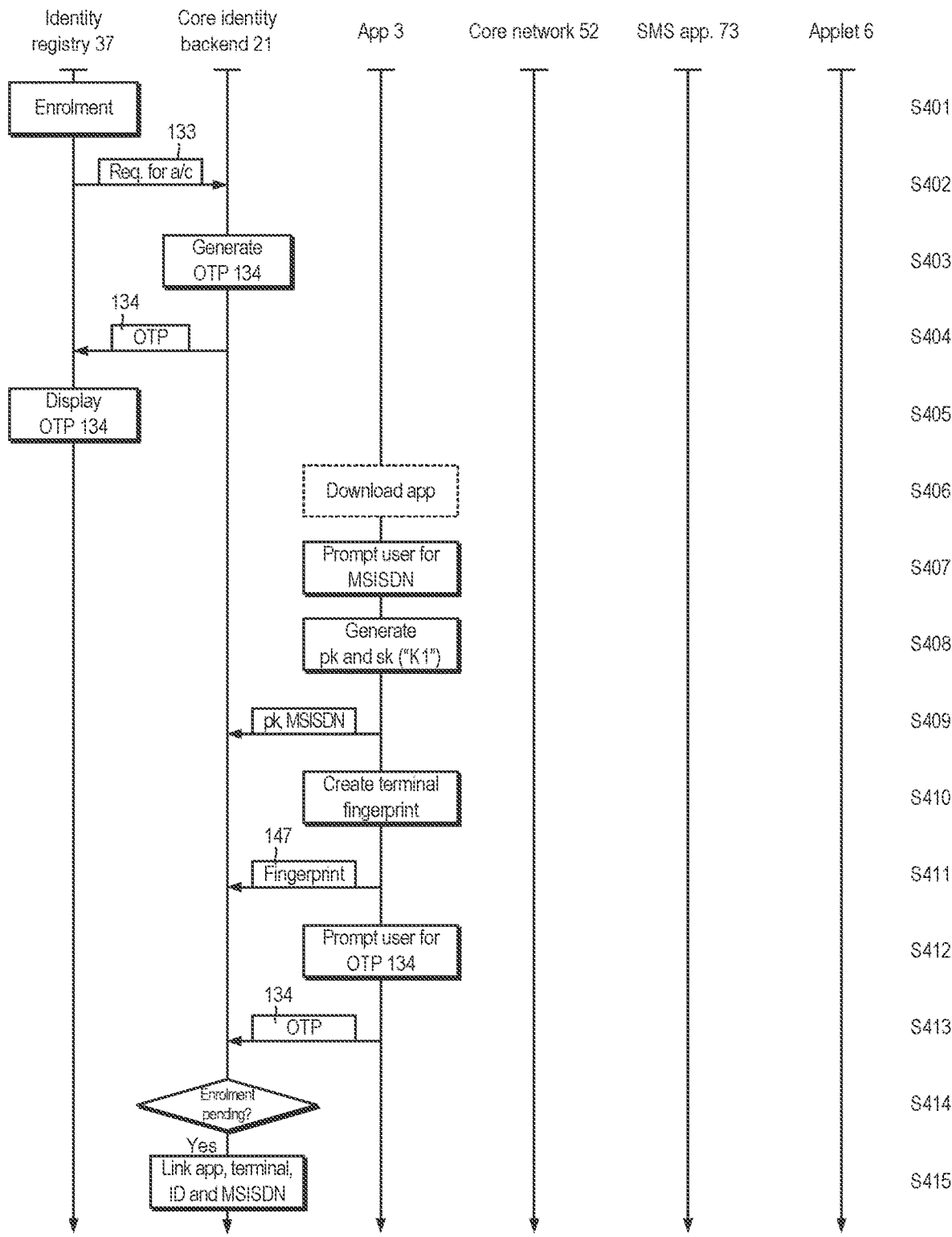
FIGS. 4a to 4d show steps in a process of enrolling a user in the authentication system shown in FIG. 1.

Referring in particular to FIGS. 2, 4a and 7, the end user opens the BMID app 3 and enters his or her MSISDN 27 (step S407). On being opened for the first time, the app 3 can present a window 141 which includes a button 142 prompting the user to create an account. The app 3 prompts the user, in a screen 143, to enter the MSISDN 27 in a field 144 and a link 145 to continue. Once the user has entered to MSISDN 27, the app 3 may present a screen 146 indicating that the MSISDN 27 is being verified.

The app 3 creates a public-private key pair K1 comprising pk, sk (step S408) and sends the public key pk, together with the MSISDN 27, to the core identity backend 21 (step S409). The core identity backend 21 can then link the MSISDN 27 to an existing session with the identity registry 37. The app 3 creates a terminal fingerprint 147 on operating system side of the terminal 4 (step S410) and sends it to the core identity backend 21 to link the app 3 and the terminal 4 with the identity 26 and MSISDN 27 (step S411). Herein, the terminal fingerprint 147 created by the app 3 is referred to a "first terminal fingerprint" or "OS-side terminal fingerprint".

The app 3 prompts the user to enter the token 134 into the app 3 (step S412). For example, the app 3 presents a screen 148 which includes a field 149 into which the user can enter the token 134 and a button 150 to indicate that the user wishes to proceed. Once the user has entered the token 134, the app 3 may present a screen 151 indicating that token 134 is being verified. The app 3 sends the copy of token 134 to the core identity backend 21 (step S413).

The token 134 is used to secure the session between identity registrar 37 and app 4 because the end user 1 could be connected via the computer 81 on the identity registrar website and to the BMID app 3 on his or her terminal 4. If, however, the identity registrar 37 has an app on the same terminal 4 as the BMID app 3, then the token 134 can be transferred silently and encrypted in app-to-app mode. In other words, the user need not be prompted to enter the token 134 into the app 3.

The core identity backend 21 checks the MSISDN 27 and the token 134 received from the app 3 to determine whether an enrolment process is pending (step S414). If the transmitted token 134 and the received token 134 match, then the core identity backend 21 links the user's identity 26, MSISDN 27, app 3 and terminal 4 in the entry 24 in the table 23 (step S415).

Figure 4B:
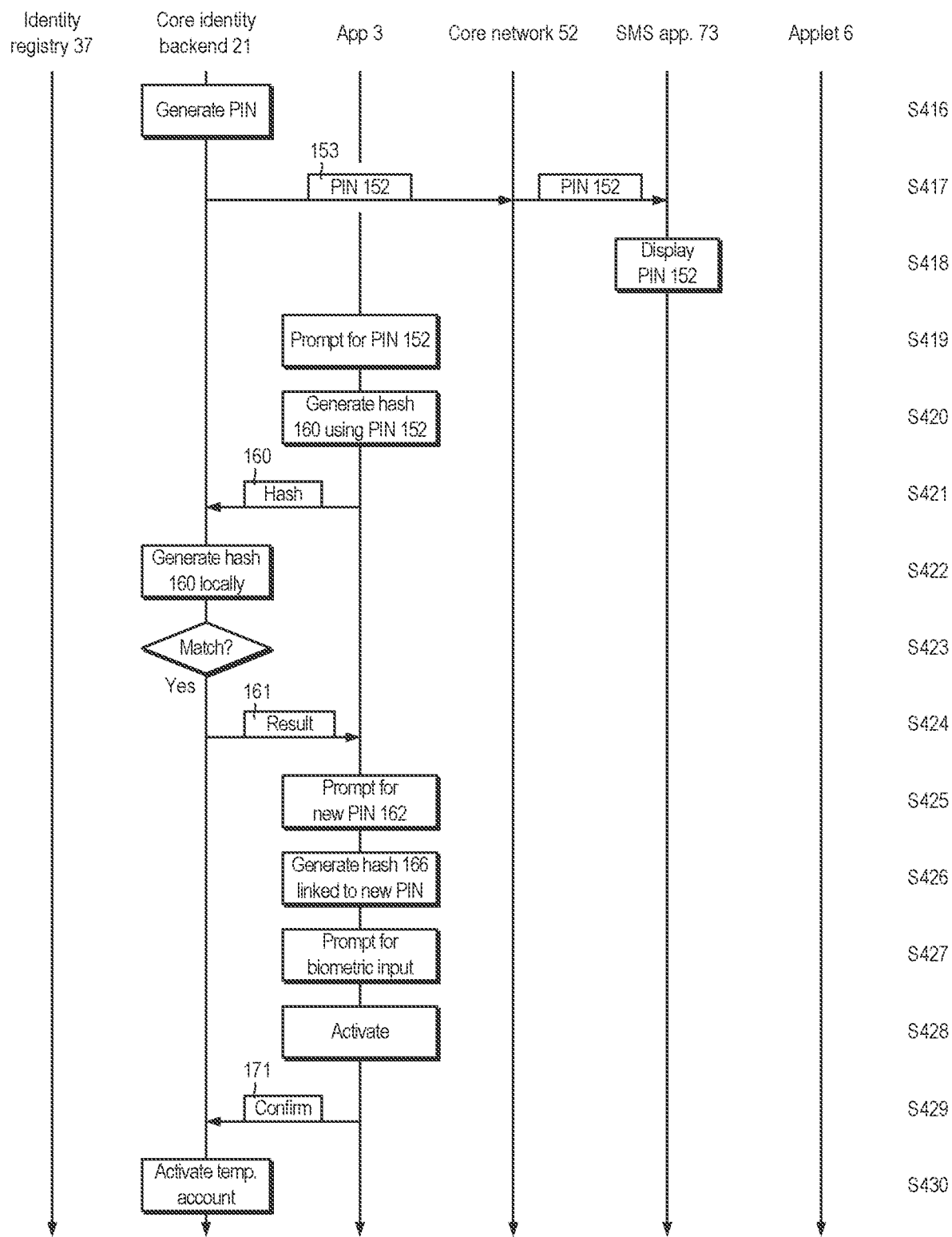
Figure 4C:
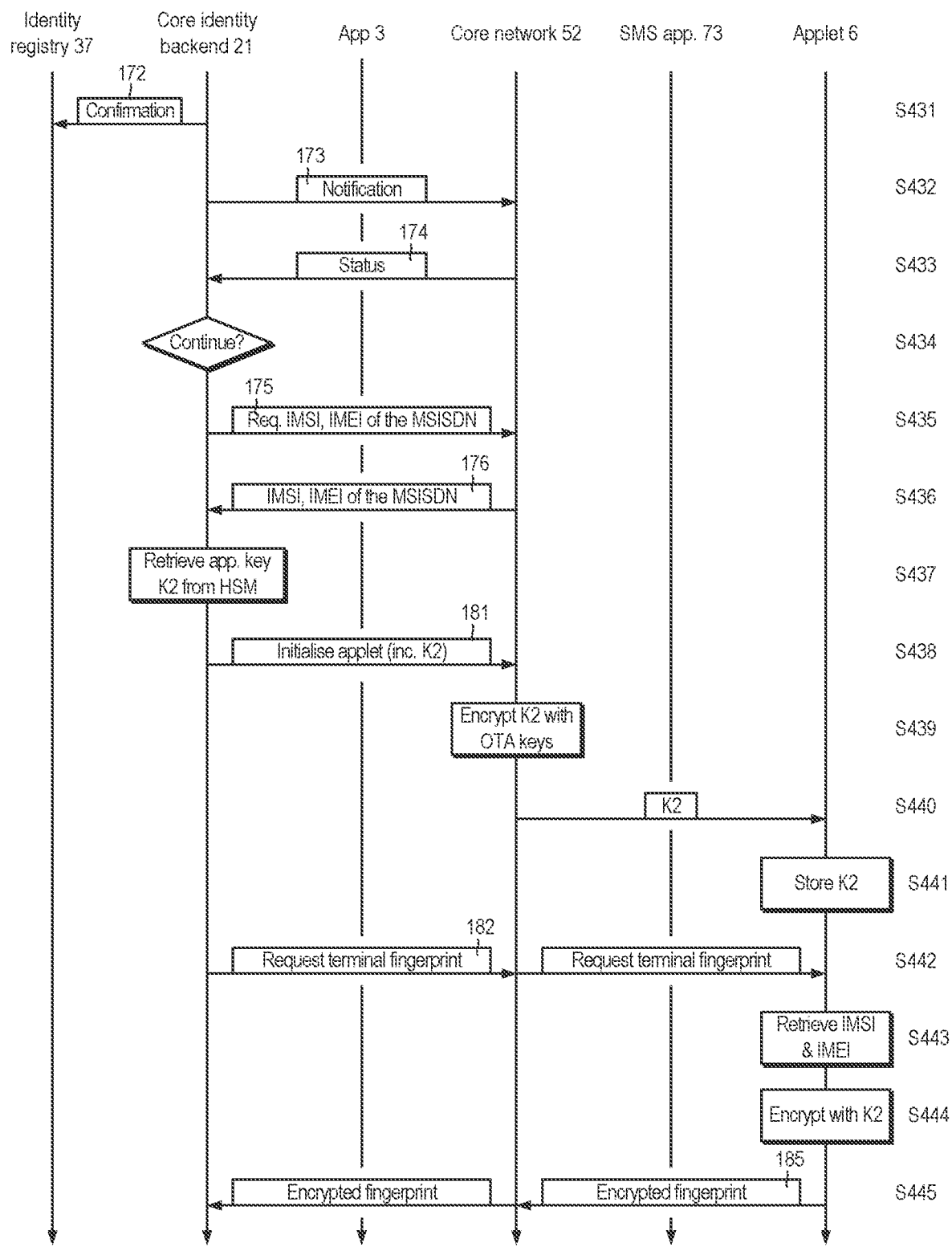
Figure 4D:
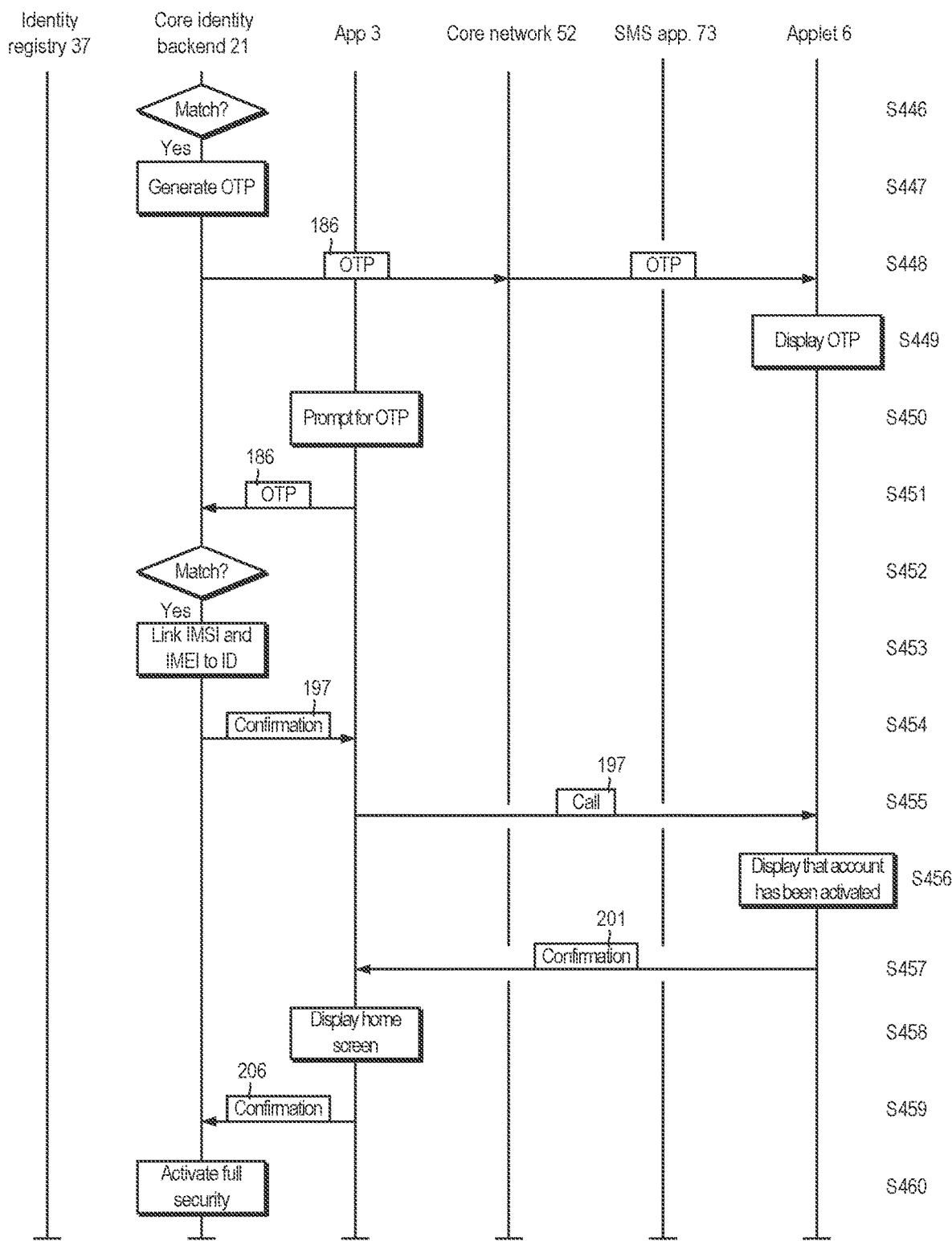

Referring in particular to FIGS. 2, 4b and 7, using the HSM 32, the core identity backend 21 generates an initial, temporary PIN 152 (step S416) and sends it via SMS (or other suitable messaging service) as an SMS message 153 to the terminal 4 (step S 417).

The terminal 4 displays the message 153 which includes the initial PIN 152 in screen 154 (step S418). The end user 1 switches to the app 3 and the app 3 prompts the user to enter the initial PIN 152 (step S419). For example, the app 3 presents a screen 156 which includes a field 157 into which the user can enter the initial PIN 152 and a button 158 to indicate that the user wishes to proceed. Once the user has entered the initial PIN 152, the app 3 may present a screen 159 indicating that the initial PIN 152 is being verified.

The BMID app 3 uses the PIN 152 to perform a one-way encryption to generate a hash 160 (step S420) and the hash 160 is transmitted to the core identity backend 21 (step S421). The core identity backend 21 generates its own version of the hash 160 using the HSM 32 (step S422) to check whether the user-entered PIN 152 is correct (step S423). If correct, the core identity backend 21 sends a result 161 back to the app 3 (step S424)

The BMID app 3 prompts the user to create and confirm a new PIN 162 (step S425). For example, the app 3 presents a screen 163 which includes a field 164 into which the user can enter a new PIN 162 and a button 165 to indicate that the user wishes to proceed. The app 3 may present another screen (not shown) asking the user to re-enter their new PIN 162. Once the new PIN 162 is confirmed, the app 3 links the new PIN 162 via a new hash 166 to the application key K1. Thus, if the PIN 162 is entered in the future, then another hash is generated, compared with the stored hash 166 and, if the hashes match, then the application key K1 is unlocked.

The BMID app 3 prompts the user to activate a biometric function, such as Touch ID or Fingerprint (step S426). For example, the app 3 presents a screen 167 which a first button 168 whereby the user can confirm he or she wishes to activate a biometric function and a second button 169 whereby the user declines to activate a biometric function. If the user activates a biometric function, then the terminal 4 prompts the user to provide biometric input, for example to press fingerprint scanner 66. Once the user has provided biometric input, the app 3 may present a screen 170 indicating that biometric input is being processed.

The BMID app 3 activates the biometric function (step S428) and sends a confirmation message 171 to the core identity backend 21 (step S429).

The core identity backend 21 updates the account level field 30 in the table 23 to indicate that the authentication account has been activated with a first, low level of security (step S430). An authentication account with a low-level of security allows the user to use their terminal 4, in particular the BMID app 3, to authenticate low-risk or low-value transactions, for example having a value no more than EUR 50.

The core identity backend 21 sends a message 172 to the identity registrar 37 to signal that that the authentication account has been activated (step S431).

At this point, the user's identity 2 has been linked to a software asset 4, namely the BMID app 3. Thus, only a partial degree of linking has been performed. Further binding, in particular involving other, independently accessed parts of the terminal 4, is carried out to provide stronger security, as will now be described in more detail.

The core identity backend 21 can automatically start the process of further binding or can first check whether to perform further binding (steps S432 to S434). This may include notifying the mobile network operator that the core identity backend 21 intends to perform hardware binding and to check whether the applet 6 is already installed on the secure element 5 or, if not installed, whether the applet 6 can be installed on the secure element 5 (steps S432 & S434).

The core identity backend 21 sends a request 175 for the IMSI 58 and IMEI 59 of the MSISDN 27 via the mobile network gateway 60 to the core mobile network systems 52 (step S435). The core mobile network systems 52 sends a reply 175 which contains the IMSI 57 and IMEI 59 at the time the terminal 4 is connected to the mobile network 51 and which is linked to the given MSISDN 27, which is known at that time and which is stored in the HLR 53. The IMSI 58 and IMEI 59 are stored in the table 23.

The core identity backend 21 retrieves the applet key K2 from the HSM 32 (step S436) and initialises the SIM applet 6 via the mobile network gateway 60 via OTA by sending a message 181 containing applet key K2 (steps S437 to S440). The OTA 54 encapsulates the message 181 into an OTA APDU with OTA key K3 so as to ensure that the applet key K2 is transmitted securely. After receiving and decrypting the message 181, the SIM applet 6 stores the applet key K2 in the SIM 5 (step S441).

The core identity backend 21 then sends a request 182 to the SIM applet 6, via the mobile network gateway 60, to send a fingerprint 183 of the terminal 4 from the secure element side (step S442).

The SIM applet 6 retrieves the IMSI 28 from the EF file system 75 stored on the secure element 5 and the IMEI 29 of the terminal 4 from the baseband data 72 via the SIM toolkit 74 to create the terminal fingerprint 183 (step S443). Herein, the terminal fingerprint 183 created by the applet 6 is referred to as the "second terminal fingerprint" or "secure element-side terminal fingerprint". The SIM applet 6 encrypts the second fingerprint 183, which contains the IMSI 28, the IMEI 29 and applet version (not shown), with the applet keys K2 (step S444) and sends the encrypted fingerprint 185 to the core identity backend 21 (step S445).

The core identity backend 21 checks if the IMSI 28 and IMEI 29 correspond to the IMSI 58 and IMEI 59 received via the mobile network gateway 60 (step S446).

If there is a match, then the core identity backend 21 generates an OTP 186 (herein referred to as a "verification code") (step S447) and sends a request 187 containing the verification code 186 to the SIM applet 6 to display the verification code 186 (step S448). This helps to ensure that the app 3 and the SIM applet 6 are on the same terminal 4.

The SIM applet 6 displays the verification code 186 via SIM toolkit display text API (step S449). For example, the SIM applet 6 displays the verification code 186 in screen 188.

The end user switches to the app 3 and the app 3 prompts the user to enter the initial PIN 186 (step S450). For example, the app 3 presents a screen 189 which includes a field 190 into which the user can enter the verification code 186 and a button 191 to indicate that the user wishes to proceed. The app 3 may also prompt the user to enter their PIN. For example, the app 3 presents a screen 192 which includes a field 193 into which the user can enter their PIN 162 and a button 194 to indicate that the user wishes to proceed. Once the user 1 has provided the verification code 186 and, optionally, their PIN 162, the app 3 may present a screen 195 indicating that the system is verifying the code 186.

The BMID app 3 sends the user-entered verification code 186 to the core identity backend 21 (step S451). The core identity backend 21 checks whether the verification code 186 is correct (step S452) and, if so, links the IMSI 28 and IMEI 29 to the identity, for example, setting a flag 31 (step S453).

The core identity backend 21 sends a confirmation 197 to the BMID app 3 (step S454).

The BMID app 3 makes a call 198 to the applet 6 (step S455) that triggers another SIM toolkit screen 199 displaying the account was activated with the SIM security (step S456). In response to the user clicking a "continue" button 200, the applet 6 notifies the app 3 with a message 201 (step S457). The BMID app 3 displays a screen 202 containing a message 203 that the link was successful (step S458) and then returns to the app home screen 204 which includes a menu 205.

The BMID app 3 sends a confirmation message 206 to the core identity backend 21 (step S459). The core identity backend 21 updates the account level field 30 in the table 23 to indicate that the authentication account has been activated with a second, high level of security (e.g. eIDAS "high" security level) (step S460).

At this point, the user's identity 2 has been linked not only to the BMID app 3, but also to the SIM applet 6 on the SIM 5 using first and second independent channels 78, 79 respectively. Thus, a greater degree of linking has been performed and so the terminal 4 can be used to authenticate higher-value transactions.

Transaction/Authentication

Figure 8A:
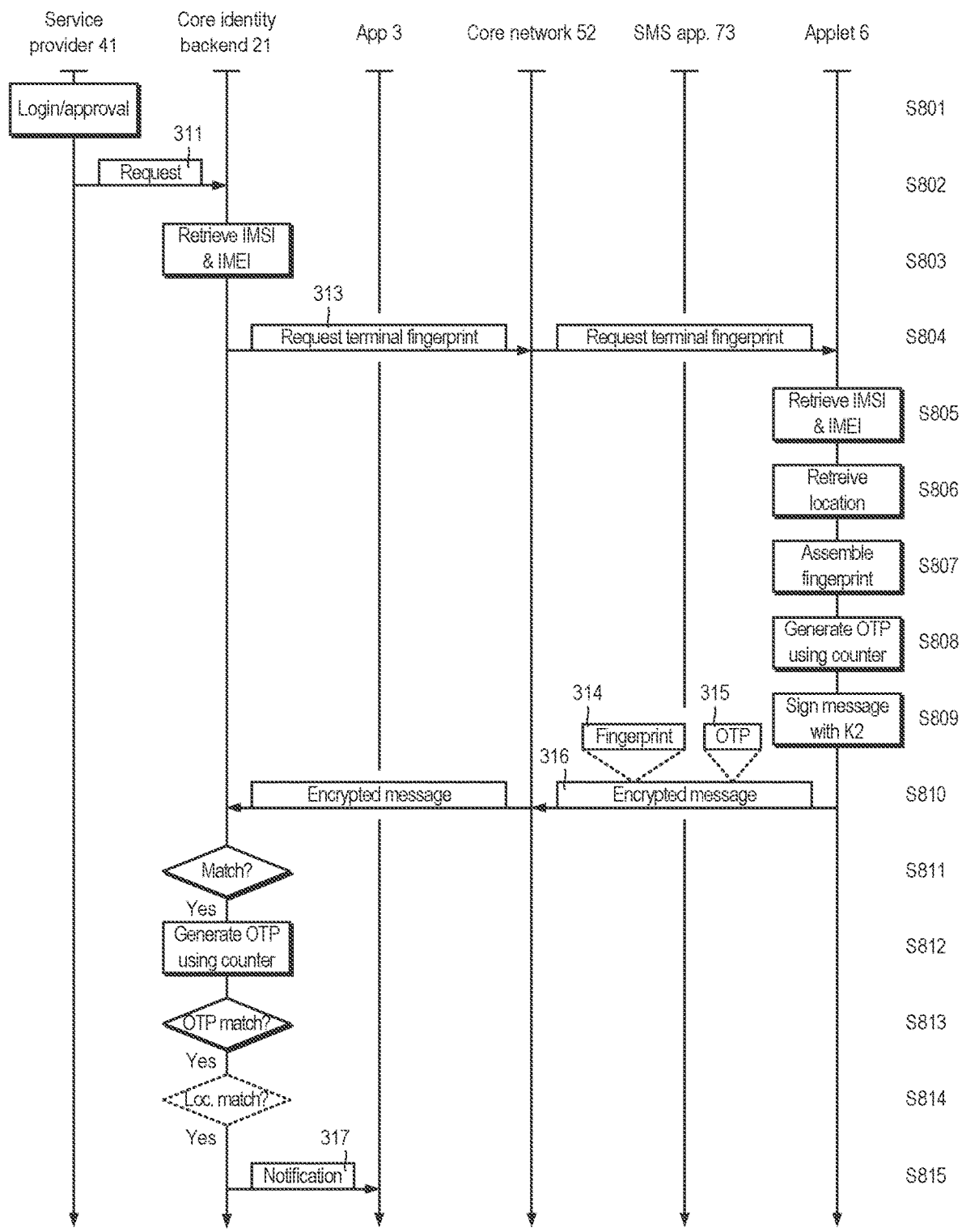
FIGS. 8a to 8c show steps in a process of authenticating a user wishing to carry out a transaction such as logging into an application website, sharing identity data, providing approval or providing a qualified electronic signature.
Figure 8B:
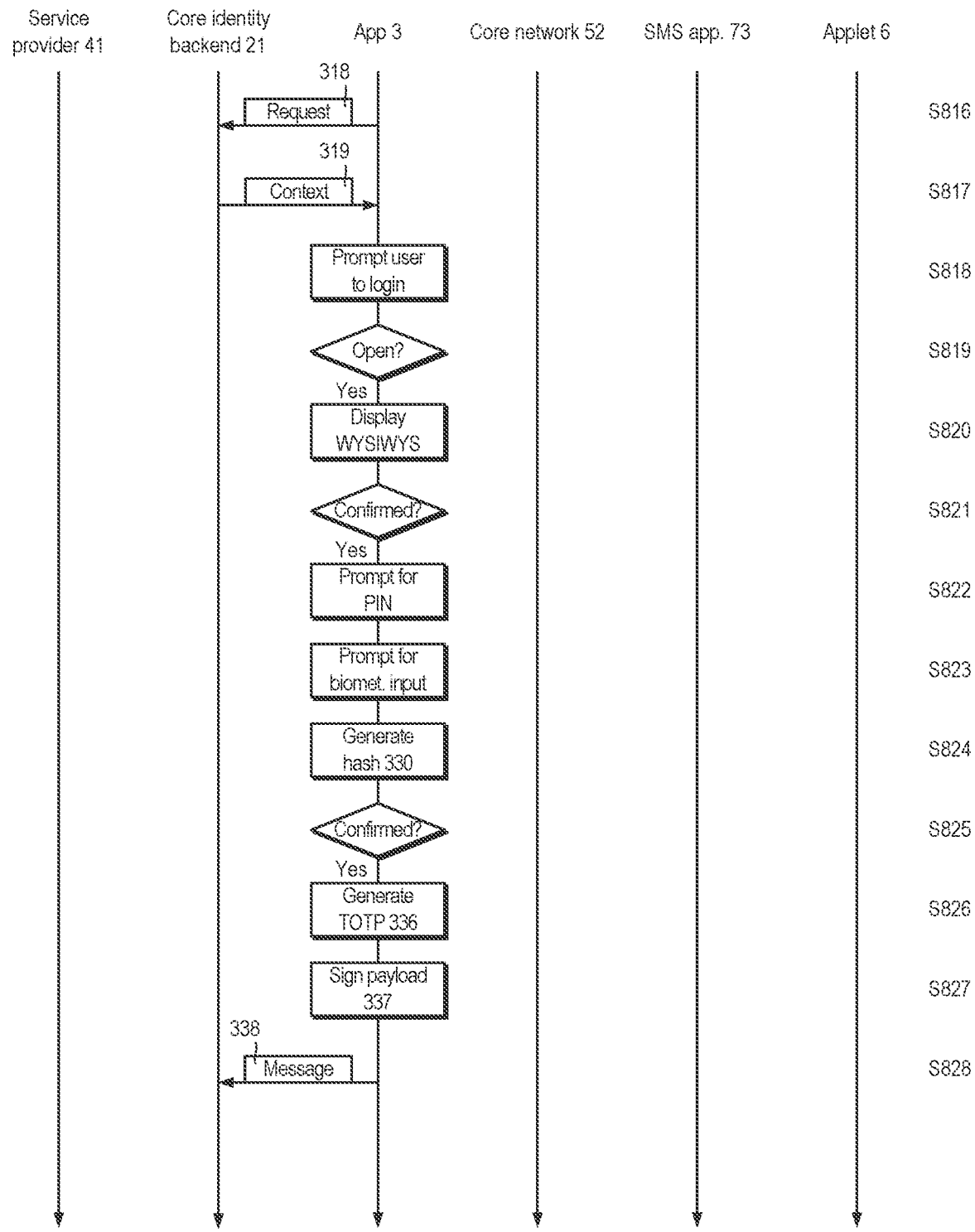
Figure 8C:
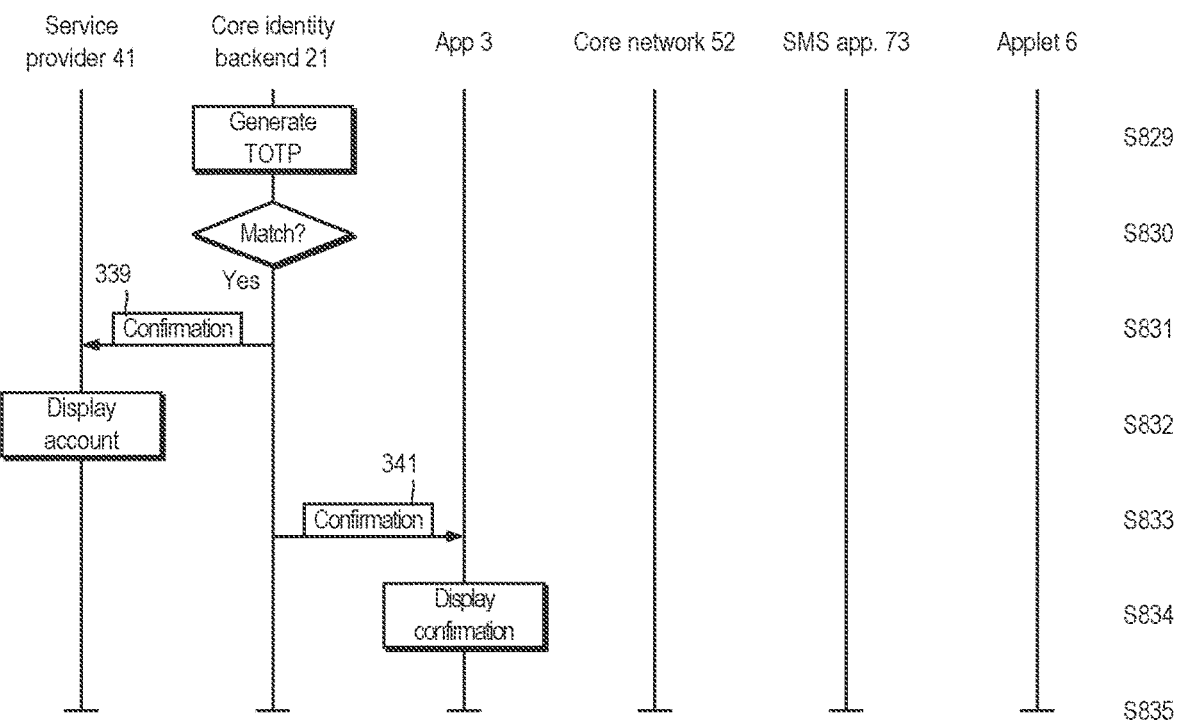
Figure 9:
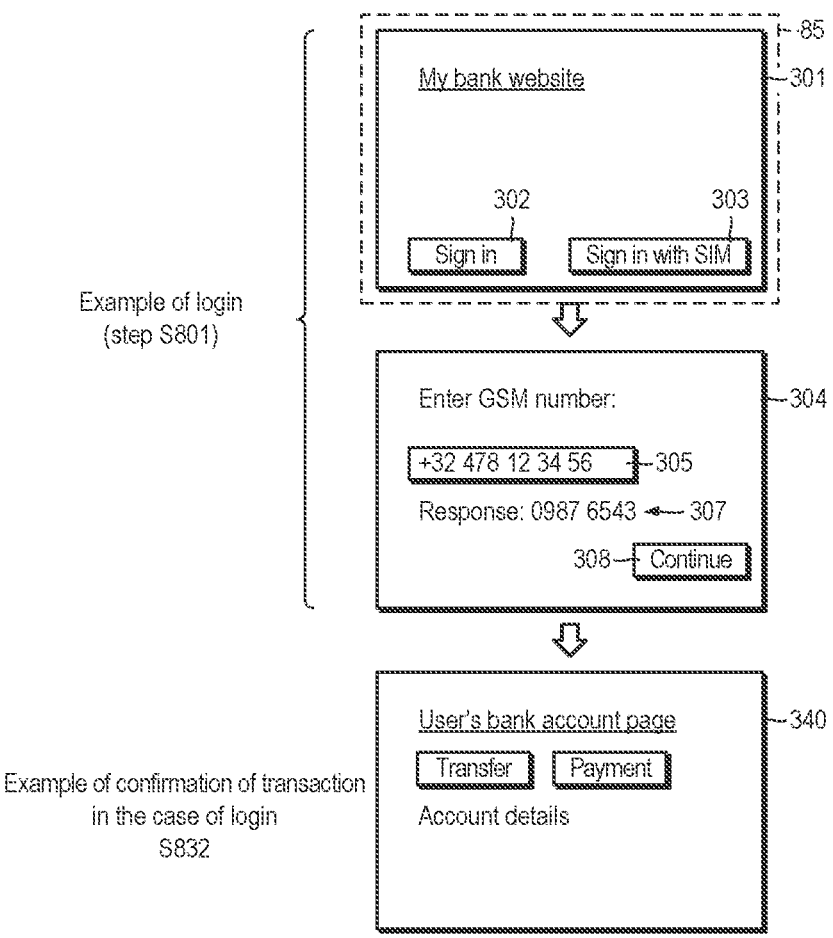
FIG. 9 illustrates an example of a first set of pages presented to a user during authentication.
Figure 10:
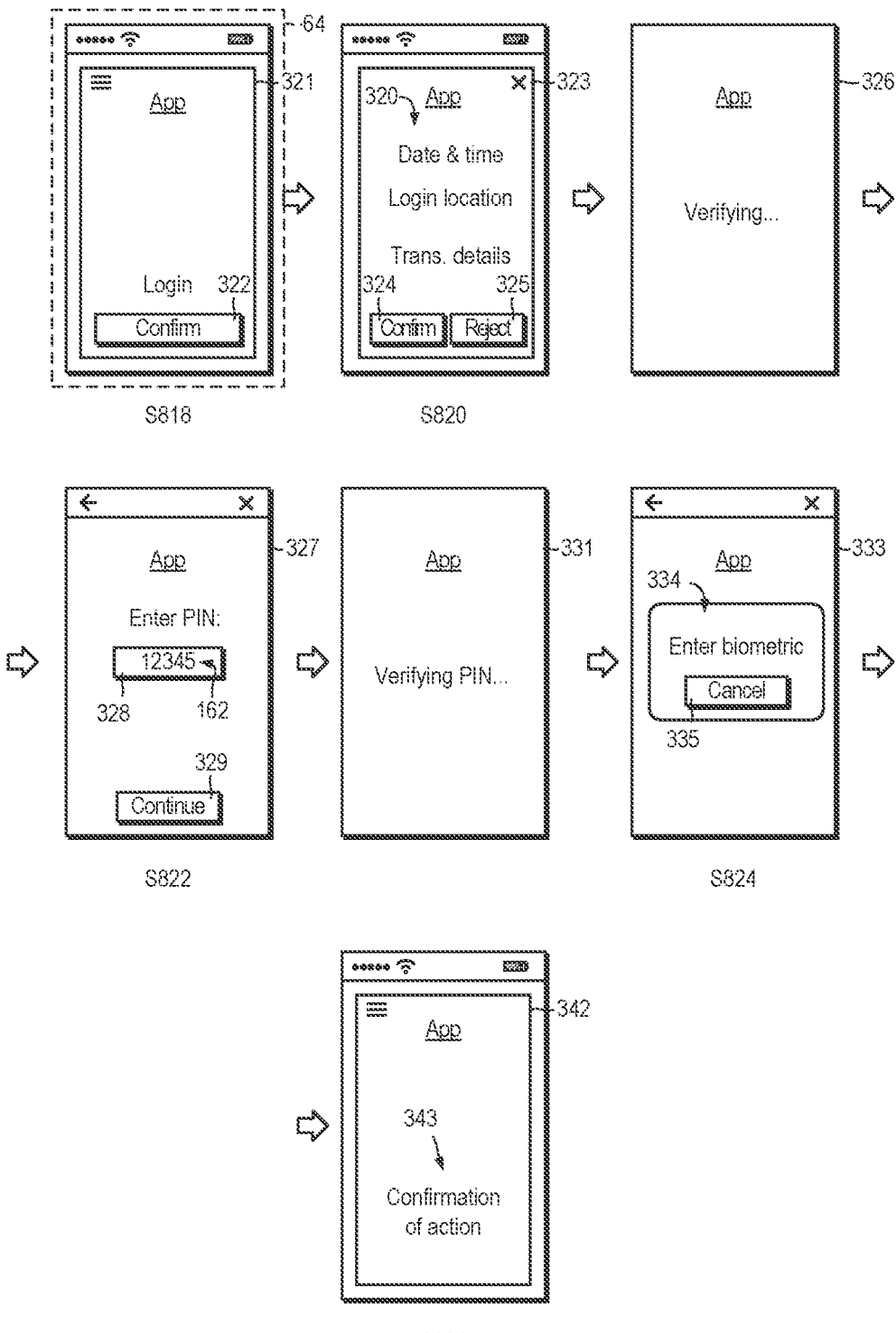
FIG. 10 illustrates an example of a second set of pages presented to a user during authentication.

Referring to FIGS. 2, 8a and 9, an end user 1 (FIG. 1) use the mobile authentication service to authenticate a transaction. In particular, assets 3, 4, 5, 6, 7, 8, 9, 10 are used to corroborate the user's identity 2 (FIG. 1).

The end user 1 requests a transaction at a service provider application (step S801). For example, the user may want to login to an application (such as banking app) or website (such as a banking website), to share identity data (for instance to create an account on an e-commerce website), to provide approval (for example, to approve a financial transaction in banking app or website, to approve transfer of medical information from doctor to insurance etc.) or to provide a qualified electronic signature or the like.

In relation to an approval, a hash can be created that is made up of part of the context that is signed (similar to a hash that is created for a bank transaction with a 3D-secure check whereby a user uses a bank card reader to type in an amount and a part of the beneficiary bank account, which then generates a challenge after which the hash is sent to the bank). In this case, however, no card reader is used. Instead, the BMID app 3 performs that role.

In relation to qualified electronic signature, the full context is signed with a qualified certificate. Using the process herein described, it is possible to sign meeting any of the three security levels (i.e. low, substantial and high) specified by the eIDAS regulation.

FIG. 9 shows an example of how the user 1 can request a transaction using a browser 88 running on a computer 81 and can authenticate the transaction using the terminal 4. In this case, a service provider is a bank.

Referring in particular to FIGS. 2 and 9, the service provider 41 presents the user 1 with a first web page 301 which includes a link 302 to sign in and a link 303 to sign in using a mobile number. For example, if SOAP or SAML is used, the service provider 41 presents a second web page 304 includes a field 305 for entering the telephone number, i.e. the MSISDN 27, of the terminal 4 possessed by the user 1. The web page 304 may include, in response to a challenge (not shown), a response 307. The web page 304 includes a link 308 to continue. If OpenID is used, the service provider 41 redirects to a centralized OpenID page hosted by the core identity backend 21. In case of an app running on the terminal 4, the telephone number can be transferred in app-to-app mode.

The service provider 41 sends a request 311 to authenticate a transaction to the core identity backend 21 via the service provider interface 45 (step S802). The request 311 includes the MSISDN 27 and a request (not shown) for the level of security required for the transaction. Levels of security may include (1) PIN only, (2) biometric only, (3) PIN and biometric, (4) PIN and OTP via SMS, (5) PIN and biometric and OTP via SMS.

The core identity backend 21 retrieves the IMSI 28 and IMEI 29 of the terminal (step S803). The core identity backend 21 sends a request 313 (or "first challenge") to the SIM applet 6 via the first channel 78, that is, via the mobile network gateway 60 and the OTA network, for SIM-side terminal fingerprint (step S804).

The SIM applet 6 retrieves the IMSI 28 from the SIM 5 and the IMEI 29 from the baseband data 72 via the SIM toolkit (step S805) and determines its location via the SIM toolkit (step S806). The SIM applet 6 generates a terminal fingerprint 314 which includes the IMSI 28, IMEI 29, applet version (not shown) and location (not shown) (step S807). The SIM applet 6 also generates an OTP 315, for example using a value of counter 76, and which may be signed using one-way OCRA encryption (step S808). A message 316 (or "first response") comprising the terminal fingerprint 314 and OTP 315 is encrypted using the SIM applet application keys K2 and by the OTA keys K3 and transmitted by the first channel 78 (step S809). The encrypted message 316 is transmitted to the core identity backend 21 via the second channel 79, i.e. via the OTA network of the mobile network 52 (step S810).

The core identity backend 21 checks whether the terminal fingerprint 314 corresponds with the IMSI 28 and IMEI 29 held locally (step S811). The core identity backend 21 also checks whether the OTP 315 corresponds to one generated locally (steps S812 & S813). If the terminal fingerprint check or the OTP check fails, then the transaction is aborted.

The core identity backend 21 may also check the location of the terminal 4 (step S814). In particular, the core identity backend 21 may check whether the terminal 4 is located in an acceptable country or region of a country, is located in an unacceptable country or region of a country, or whether a login location and the location of the terminal 4 or the locations between two transactions differ by more than given distance or by more than given distance in a given time (e.g. login in country A and approval in country B which is over 1,000 km away, 2 minutes later). Thus, location can be used as a risk parameter for fraud detection and/or can be used as an additional factor for authentication.

If the terminal fingerprint corresponds to the one obtained during the binding process, then the core identity backend 21 transmits a notification 317 to the app (step S815).

The app 3 sends a request 318 for the context of the transaction (step S816) and the core identity backend 21 transmits a message 319 ("a second challenge") via the second channel 79 (i.e. via the Internet) containing information 320 about the context of the transaction, such as the name of the service provider, the nature of the transaction (e.g. login, share id, approval, signature), time and date, information about on the transaction etc. (step S817). A standard template (such as CAP template for banking transactions) may be used.

The app 3 prompts the user to login on the terminal 4 on a first screen 321 (steps S818 & S819). If the user presses a continue button 322, the app 3 presents a second screen 322 (a so-called "what-you-see-is-what-you-sign" or "WYSIWYS" screen) to the user which includes the information 320 about the context of the transaction, and options 324, 325 to either accept or reject the transaction (step S820). If accepted (step S821), the app 3 presents a third screen 326 indicating that the transaction is being verified.

The app 3 then prompts the user to provide up to three (or more) types of authentication, such as PIN, OTP and biometric (steps S821 to S824).

The app 3 may prompt the user to enter their PIN 162 (step S821). For example, the app 3 may present a fourth screen 327 which includes a field 328 to enter the PIN 162 and a button 329 to continue. The app 3 presents a fifth screen 331 indicating that the transaction is being verified.

The app 3 may prompt the user for biometric input (step S823). For example, the app 3 may present a sixth screen 333 which includes a message 334 instructing the user, for example, to use fingerprint. The screen 333 may include an option to cancel 335. The terminal 4 checks the biometric input.

The app 3 (in particular the Gemalto Ezio SDK) uses the PIN 162 to perform a one-way-encryption to generate a hash 330 (step S824). The app 3 (in particular the Gemalto Ezio SDK) checks the hash 330 (step S825). If correct, then app 3 (in particular the Gemalto Ezio SDK) generates an OTP 336 ("a second response") in the form of a TOTP based on a terminal fingerprint 332 and the received context 319 (step S826) and signs the payload 327 using OCRA using the key K1 (step S827). The OS-side terminal fingerprint 332 is generated by the Gemalto Ezio SDK.

The app 3 sends the payload 337 to the core identity backend 21 via the second channel 79 (step S328) where it is verified against the result of the same calculation carried out at the backend 21 (steps S829 & S830). In particular, the same calculation may be carried out by the HSM 32.

If the results do not match, then the transaction is aborted. If the results match, then the core identity backend 21 sends a confirmation 338 to the service provider 41 (step S831) which presents an appropriate web page 339 (step S832) and a confirmation 340 to the app 3 which presents a screen 341 with a message 342 confirming that the transaction has been authorized.

Modifications

It will be appreciated that various modifications may be made to the embodiments hereinbefore described. Such modifications may involve equivalent and other features which are already known in the design, manufacture and use of authentication, on-line banking and mobile communication terminals and component parts thereof and which may be used instead of or in addition to features already described herein. Features of one embodiment may be replaced or supplemented by features of another embodiment.

The fingerprint scanning process on the OS-side of the terminal may be configurable and can be made more or less strict by activating additional or few OS parameters.

The service provider application, even if run in a browser, need not be does not need to be installed or run on terminal. It can be run on another different device, such as a personal computer IoT device.

The core identity backend may comprise one or more servers.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. An authentication system comprising:
at least one processor;
wherein the authentication system is configured, in response to receiving a request to authenticate a transaction:
to send a first challenge to a secure element comprised in a mobile terminal via a first channel and, in response to receiving a first response to the first challenge from the secure element via the first channel, to determine whether the first response is correct, wherein the first challenge is based on a secure element identifier uniquely identifying the secure element and a hardware identifier uniquely identifying hardware of the mobile terminal;
in response to a determination that the first response is correct, to send a second challenge to a processor-based controller comprised in the mobile terminal via a second, different channel and, in response to receiving a second response to the second challenge from the processor-based controller via the second channel, to determine whether the second response is correct, wherein the second challenge is based on a first terminal fingerprint and information relating to the transaction, and wherein the secure element and the processor-based controller are independently accessible; and
in dependence upon the first and second responses being correct, to signal that the transaction is authenticated;
wherein the authentication system is further configured, in an enrolment phase;
to exchange data with mobile terminal via the second channel to receive a second terminal fingerprint of the mobile terminal via the second channel; and
to exchange data with the mobile terminal via the first channel to determine the secure element identifier and the hardware identifier of the mobile terminal via the first channel;
and wherein the authentication system is further configured, in the enrolment phase;
in response to receiving, from a source, a request to enrol a user comprising the user identifier and the mobile terminal identifier, to transmit a first password to the source for presentation to the user and/or to the mobile terminal;
in response to receiving, from an application running on the mobile terminal, a first key (K1), the second terminal fingerprint and a copy of the first password via a second channel, to link the user identifier, the mobile terminal identifier, the application and the mobile terminal, to transmit a random number to a secure element in the mobile terminal via the first channel;
to send a second key (K2) to the secure element via the first channel;
in response to receiving, from the secure element via the first channel, an encrypted message comprising a third terminal fingerprint encrypted with the second key, to transmit a second password, to the secure element via the first channel; and in response to receiving, from the application via the second channel, a copy of the second password and in dependence upon the copy of the second password matching the second password, to link the user identifier and the third terminal fingerprint or data included in the third terminal fingerprint.

2. The authentication system according to claim 1, wherein the first channel comprises a mobile phone network operator channel used to communicate securely with the secure element in the mobile terminal.

3. The authentication system according to claim 1, wherein the second channel comprises the Internet.

4. The authentication system according to claim 1 which is further configured, in relation to the first challenge:
to retrieve the secure element identifier uniquely identifying the secure element in the mobile terminal and the hardware identifier uniquely identifying the hardware of the mobile terminal; and
to transmit the first challenge to the secure element via the first channel; wherein the first response includes a fourth terminal fingerprint and/or a third password, wherein the fourth terminal fingerprint includes the secure element identifier and the hardware identifier or is generated in dependence on the secure element identifier and the hardware identifier, wherein the authentication system is further configured:
to determine whether the received fourth terminal fingerprint is correct in dependence upon the retrieved secure element identifier and hardware identifier and/or to determine whether the received third password is correct in dependence upon a first locally-generated or first locally-held password.

5. The authentication system according to claim 1, which is further configured, in relation to the second challenge:
to transmit information relating to the transaction;
wherein the second response includes a fourth password generated in dependence on the first terminal terminal fingerprint and at least some of the information relating to the transaction, and wherein the authentication system is further configured:
to determine whether the received fourth password is correct in dependence upon a second locally-generated or second locally-held password.

6. The authentication system according to claim 1, wherein the second response is signed or encrypted with the first key (K1).

7. A mobile terminal for use in authenticating a transaction comprising a secure element and a processor-based controller, the secure element configured:
in response to receiving a first challenge from an authentication system via a first channel, to generate and transmit a first response to the authentication system via the first channel, wherein the first challenge is based on a secure element identifier uniquely identifying the secure element and a hardware identifier uniquely identifying hardware of the mobile terminal; and
the processor-based controller configured:
in response to receiving a second challenge from the authentication system via a second, different channel, to generate and transmit a second response to the authentication system via the second channel, wherein the second challenge is sent in response to a determination by the authentication system that the first response is correct, and wherein the second challenge is based on a first terminal fingerprint and information relating to the transaction, and wherein the secure element and the processor-based controller are independently accessible; and wherein the mobile terminal is configured, in an enrolment phase;

to exchange data with the authentication system via the second channel to provide a second terminal fingerprint of the mobile terminal to the authentication system via the second channel; and to exchange data with the authentication system via the first channel to provide the secure element identifier and the hardware identifier of the mobile terminal to the authentication system via the first channel;

and wherein the mobile terminal is further configured, in the enrolment phase;

in repsonse to the authentication system receiving, from a source, a request to enrol a user comprising the user identifier and the mobile terminal identifier and the authentication system transmitting a first password to the source for presentation to the user and/or to the mobile terminal, to send a first key (K1), the second terminal fingerprint and a copy of the first password from an application running on the mobile terminal via the second channel to the authentication system, wherein the authentication system is configured to link the user identifier, the mobile terminal identifier, the application and the mobile terminal in response to receiving the first key, the second terminal fingerprint, and the copy of the first password;

in response to the secure element receiving a random number and a second key (K2) from the authenitcation system via the first channel, to transmit an encrypted message comprising a third terminal fingerprint encrypted with the second key to the authentication system;

in response to the secure element receiving a second password via the first channel, to transmit a copy of the second password from the application via the second channel to the authentication system, wherein the authentication system is configured to link the user identifier and the third terminal fingerprint or data included in the third terminal fingerprint in dependence upon the copy of the second password matching the second password.

* * * * *